UNITED STATES PATENT OFFICE.

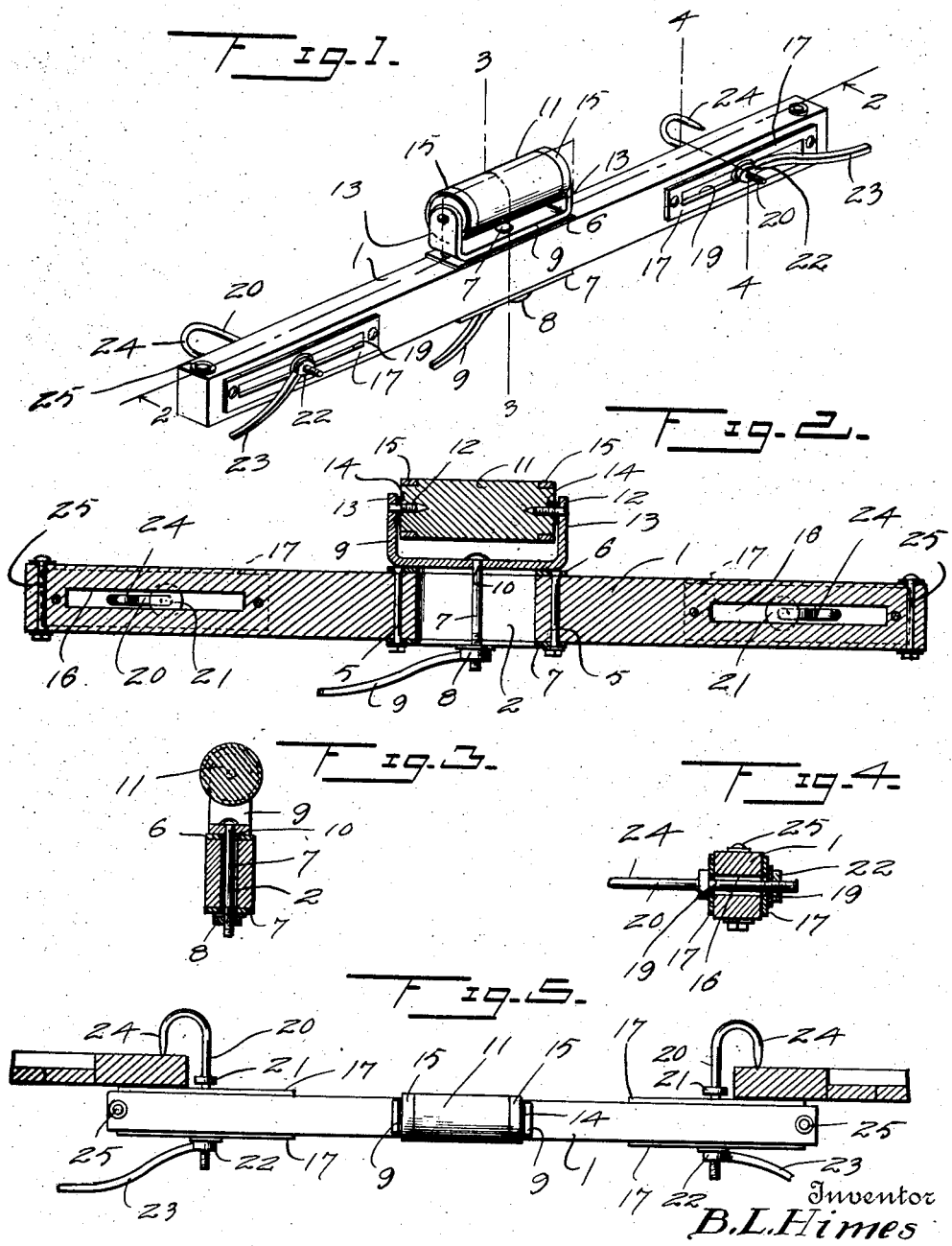

BURNIE L. HIMES, OF BRASFIELD, ARKANSAS.

LOADING AND UNLOADING DEVICE.

1,337,356.  Specification of Letters Patent.  Patented Apr. 20, 1920.

Application filed June 21, 1919. Serial No. 305,789.

*To all whom it may concern:*

Be it known that I, BURNIE L. HIMES, a citizen of the United States, residing at Brasfield, in the county of Prairie and State of Arkansas, have invented certain new and useful Improvements in Loading and Unloading Devices, of which the following is a specification, reference being had to the accompanying drawings.

This invention relates to an improved loading and unloading device for various cars, either box or flat cars, or may be used on any car that is provided with uprights, stakes, or standards and one of the objects of the invention is to provide a device of this kind that may be used equally as well on the interior of a box car, for loading lumber into the ends of the car.

The invention in its broadest aspect aims to provide simple and improved means for fastening the loading and unloading device to the car.

The invention further aims to provide a loading and unloading device, which is simple, efficient and practical in construction, and may be inexpensively manufactured and sold at a reasonable profit.

While the design and construction at present illustrated and set forth is deemed preferable, it is obvious that as a result of a reduction of the invention to a more practical form for commercial purpose, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a perspective view of the loading and unloading device constructed in accordance with the invention.

Fig. 2 is a longitudinal sectional view on line 2—2 of Fig. 1.

Fig. 3 is a cross-sectional view on line 3—3 of Fig. 1, through the roller and the bar.

Fig. 4 is a cross-sectional view on line 4—4 of Fig. 1, through one of the connecting hooks.

Fig. 5 is a view in elevation showing the application of the loading and unloading device.

Referring more especially to the drawings, 1 designates a bar, which may be of any suitable proportions, or configuration. This bar may be constructed of any suitable material, preferably wood such as oak, but not necessarily, for it is obvious that the bar may be constructed of metal equally as well.

The bar at a point substantially intermediate its ends is provided with an elongated slot 2, and the upper and lower faces of the bar have bolted or otherwise secured thereto as shown at 5, wear plates 6 and 7, which are slotted correspondingly to the slot 2 of the bar. The slots of the wear plates and the slot 2 of the bar receive a bolt 7, the threaded extremity of which is provided with a nut 8 having a handle 9, which extends in an offset direction from the nut, whereby the handle can be easily grasped, for adjusting the nut and the bolt, to tighten the same in position, or loosening the bolt. A U-shaped plate 9 engages one of the central wear plates of the bar, and the horizontal part of this U-shaped plate has an opening 10, for the reception of the bolt, whereby the horizontal part of the U-shaped plate is mounted between the head of the bolt and the upper wear plate. A lumber loading and unloading roller is provided, and this roller 11 may be constructed of any suitable material, wood or metal, preferably wood such as oak, but not necessarily, and is provided with pintles 12, which are threaded or otherwise secured in the end portion of the roller. The extended ends of these pintles 12 are journaled in suitable bearings of the arms 13 of the U-shaped plate, whereby the roller may freely rotate, when loading and unloading lumber. It is to be noted that nuts 14 are threaded on the pintles, to contact with the end faces of the roller, to not only lock the pintles in place, but to space the ends of the roller from the inner faces of the arms of the U-shaped plate. Should the roller be constructed of wood, but not necessarily, annular bands 15 are fitted on the reduced ends of the roller, thereby reinforcing the roller and preventing the same from splitting near their ends. It is to be observed that by adjusting the nut on the bolt which supports the U-shaped plate adjustably in position, the U-shaped plate and the roller may be adjusted in a parallel plane with relation to the slot of the bar, the U-shaped plate and the roller may be arranged at an angle to the bar.

Each end portion of the bar is provided with an elongated slot 16, and upon the opposite side faces of the bar are wear plates 17, which may be bolted or otherwise secured in position, as indicated at 18. These wear plates are slotted as shown at 19, the slots of which being in registration with the slot 16. A holding hook 20 is provided, and its shank extends through the slot 19 and the slot 16. A portion of the shank is provided with a collar, which may be integrally or otherwise connected to the shank, and this collar 21 engages one of the wear plates. The end portion of the shank of the hook is threaded, and is engaged by a nut 22, which is provided with a lever 23, thereby making it possible to tighten or loosen the nut as may be desired, to hold the shank of the hook in different adjusted positions in the slot 16. It is obvious that the hook may be adjusted rotatably in the slot, so that the hook proper 24 may engage any suitable stationary support, such as a standard, rod or any other like stationary device, so that the bar carrying the roller may be applied in various manners to cars. The ends of the bar have bolts 25 extending vertically thereof, to prevent splitting of the bar. Other means for this purpose may be employed if necessary. This improved loading and unloading lumber roller may be worked on all styles of cars, on box cars, as well as on flat cars, and it is to be noted that the holding means for the bar may be arranged to be connected to stationary supporting means of various constructions and arrangement. Furthermore, the holding means may be adjusted to accommodate different stationary supporting means. It will be noted that this improved loading and unloading device is constructed as a single article and has no separate parts. Furthermore, the roller is at all times carried upon the supporting bar, and also by virtue of the levers of the nuts the use of wrenches or similar devices is eliminated. Furthermore, the adjustments of the various parts are simple, and efficient and durable in use. This loading and unloading device will withstand all the strains that may be exerted due to heavy loading and unloading, and also it is possible to unload and load light articles as well as heavy pieces. It is possible to arrange the bar in the door opening, by permitting the terminals of the hooks to engage the inner face of the wall of the car near the jamb of the door opening while the bar engages the outer face of the side of the car and near the jamb of the door opening, after which the securing nuts may be tightened by manipulating the handles or arms of the nuts. It is to be noted that the terminals of the hooks are sharp, so as to penetrate into the wood of the side of the car, in order to prevent the bar from slipping, and owing to this manner of applying the supporting bar and the roller, it is possible to arrange the bar in various adjusted positions relatively to the door opening of the car.

The invention having been set forth, what is claimed as new and useful is:

In a loading and unloading device, the combination with a supporting bar having slots in its opposite ends arranged horizontally crosswise through the bar, hooks having their shanks engaging through the slots, said hooks having their extremities sharpened to engage the inner face of the side of the car near the jamb, means threaded upon the shanks of the hooks and having manually operated arms for tightening said means to hold the shanks of the hooks in different adjusted positions in the slots, said bar having a central slot at right angles to the first slots, a U-shaped plate mounted on the bar and carrying a loading and unloading lumber roller, means passing through the U-shaped plate and the central slot for holding the plate in different adjusted positions in the central slot and also holding the plate in different angular positions relative to the bar.

In testimony whereof I hereunto affix my signature in the presence of two witnesses.

BURNIE L. HIMES.

Witnesses:
W. B. SUMMER,
RANDELL JONES.